United States Patent
Peng et al.

(10) Patent No.: US 9,002,011 B2
(45) Date of Patent: Apr. 7, 2015

(54) METHOD FOR GENERATING CONSISTENT CRYPTOGRAPHIC KEY BASED ON WIRELESS CHANNEL FEATURES

(75) Inventors: Yuexing Peng, Beijing (CN); Kan Zheng, Beijing (CN); Guangwei Li, Beijing (CN)

(73) Assignee: Beijing University of Posts and Telecommunications, Beijing (CN)

(*) Notice: Subject to any disclaimer, the term of this patent is extended or adjusted under 35 U.S.C. 154(b) by 0 days.

(21) Appl. No.: 14/130,308

(22) PCT Filed: Jun. 30, 2011

(86) PCT No.: PCT/CN2011/076742
§ 371 (c)(1),
(2), (4) Date: Dec. 30, 2013

(87) PCT Pub. No.: WO2013/000174
PCT Pub. Date: Jan. 3, 2013

(65) Prior Publication Data
US 2014/0140510 A1     May 22, 2014

(51) Int. Cl.
*H04L 29/06*     (2006.01)
*H04W 74/00*     (2009.01)
*H04L 9/08*     (2006.01)

(52) U.S. Cl.
CPC .............. *H04W 74/00* (2013.01); *H04L 9/0875* (2013.01); *H04L 9/0861* (2013.01)

(58) Field of Classification Search
CPC .... H04W 74/00; H04L 9/0861; H04L 9/0875
See application file for complete search history.

(56) References Cited

U.S. PATENT DOCUMENTS

2002/0034267 A1*    3/2002   Chuang et al. ............... 375/340
(Continued)

FOREIGN PATENT DOCUMENTS

| CN | 1993923 | 7/2007 |
|---|---|---|
| CN | 101902265 | 12/2010 |

(Continued)

OTHER PUBLICATIONS

International Search Report for PCT/CN2011/076742, mailed Apr. 5, 2012 (2 pages).

*Primary Examiner* — Jeffrey Pwu
*Assistant Examiner* — William Corum, Jr.
(74) *Attorney, Agent, or Firm* — Patent Law Works LLP

(57) ABSTRACT

The present invention discloses a method for generating a consistent cryptographic key based on wireless channel features. First of all, channel estimated values $\hat{h}_a$, $\hat{h}_b$ and channel estimate mean square error MSE are obtained through channel estimate, and then quantized channel eigenvectors $\bar{h}_a$ and $\bar{h}_b$ are obtained through quantization coding; next, inconsistency between $\bar{h}_b$ and $\bar{h}_a$ is equivalent to obtaining $\bar{h}_b$ at end B through virtual channel noise adding the channel eigenvector $\bar{h}_a$ sent by end A, and Signal-to-Noise ratio SNR $\Gamma$ of the virtual channel is determined; a proper coding mode ENC is determined according to the virtual channel SNR $\Gamma$; both communication parties perform corresponding coding and decoding according to ENC and thereby obtain an estimated value $\hat{\bar{h}}_a$ of $\bar{h}_a$; finally, a cryptographic key generating function is applied to $\bar{h}_a$ and $\hat{\bar{h}}_a$, whereby a cryptographic key Kc is obtained. The present invention increases the validity of consistent dynamic cryptographic key generating and achieves information security and privacy at the physical layer.

11 Claims, 4 Drawing Sheets

(56) References Cited

U.S. PATENT DOCUMENTS

2007/0206689 A1* 9/2007 Koo et al. .................. 375/260
2008/0304658 A1* 12/2008 Yuda et al. .................. 380/44
2012/0106739 A1* 5/2012 Ly et al. .................. 380/270

FOREIGN PATENT DOCUMENTS

| CN | 101998390 | 3/2011 |
| EP | 1710968 | 10/2006 |
| WO | 2011023129 | 3/2011 |

* cited by examiner

METHOD FOR GENERATING CONSISTENT CRYPTOGRAPHIC KEY BASED ON WIRELESS CHANNEL FEATURES

CROSS REFERENCE TO RELATED APPLICATIONS

This application is a National Stage of International Application No. PCT/CN2011/076742 filed Jun. 30, 2011, entitled "Method for Generating Consistent Cryptographic Key Based on Wireless Channel Features", and is hereby, incorporated by reference.

BACKGROUND

The present invention relates to the field of wireless communication technology, and more specifically, to a method for generating consistent cryptographic keys based on wireless channel features.

As wireless communication technology develops rapidly and penetrates into society and economy, the security of wireless services and the importance of privacy protection get increasingly prominent. Due to the openness of wireless channels, the air interface of a wireless communication system is vulnerable to eavesdropping, falsification, deletion and other types of attacks and thus becomes a weak link of the wireless communication system.

Coupled with broadcast properties, wireless channels also have nature such as randomness, privacy and reciprocity. Existing methods for generating cryptographic keys based on wireless channel features are based on the reciprocity of wireless channels, i.e. channel status information of both communication parties has consistency in channel coherence intervals, so cryptographic keys are generated using estimated values of channel status information. These methods contain drawbacks. That is, since the channel estimate inconsistency between both communication parties caused by noise and interference is not taken into consideration, respective cryptographic keys generated by both communication parties are not necessarily consistent. Or consideration is given to the channel estimate inconsistency caused by noise and interference; nevertheless, it is believed, mistakenly, that noise and interference can be tackled and consistent estimated values of channel status information are achieved by generating and sending to the other party check bit information through specific channel encoding and then the other party decoding based on own channel estimated values and the received check bit information, whereas the error correction performance of a preset specific channel encoding scheme is rather limited and does not match current channel status; thus, it is difficult to ensure the consistency between channel estimated values under massive changes of Signal-to-Noise ratio (SNR) caused by rapid channel changes, nor to ensure the consistency between cryptographic keys generated by both communication parties.

In a real system, as there exists interference such as thermal noise, error of the channel status information estimate is necessarily present, so that channel status estimated values of both communication parties might be inconsistent. When the channel estimate error of both communication parties is great enough to damage the cryptographic key consistency, how to ensure design cryptographic key negotiation technology and thus ensure the cryptographic key consistency becomes a critical problem as to the physical layer security.

SUMMARY

It is a primary object of the present invention to provide a method for generating a consistent cryptographic key based on wireless channel features, so as to increase the validity of consistent cryptographic key generation.

Another object of the present invention is to provide a method for determining a coding mode matching current channel features, so as to determine a matching coding mode according to different channel status.

To achieve the above objects, the present invention provides a method for generating a consistent cryptographic key based on wireless channel features, the method comprising:

(1) according to a preset channel estimate method CE, both communication ends A and B performing channel estimate to a current channel, obtaining channel estimated values $\hat{h}_a$, $\hat{h}_b$ and channel estimate mean square error MSE, and defining MSE=$f_1$(CE,$\gamma$) according to current channel Signal-to-Noise ratio $\gamma$, where $f_1$ represents a relational expression between the current channel Signal-to-Noise ratio $\gamma$ and the channel estimate mean square error MSE when using the channel estimate method CE;

(2) according to a preset quantization mode and quantization step, performing quantization encoding to the obtained channel estimated values $\hat{h}_a$ and $\hat{h}_b$ respectively, thereby obtaining quantized channel eigenvectors $\tilde{h}_a$ and $\tilde{h}_b$;

(3) letting inconsistency between the channel eigenvector $\tilde{h}_b$ of end B and the channel eigenvector $\tilde{h}_a$ of end A, i.e. $\tilde{h}_b = \tilde{h}_a + e$ be equivalent to obtaining $\tilde{h}_b$ at end B through virtual channel noise adding the channel eigenvector $\tilde{h}_a$ sent by end A, where SNR of the virtual channel is $$\Gamma = \frac{|\tilde{h}_a|^2}{E(|e|^2)} = \frac{1}{4[f_1(CE,\gamma) + MSE_Q]},$$

wherein e represents total quantization error of channel estimate results of ends A and B, and $MSE_Q$ represents quantization mean square error that is decided by the quantization step;

(4) according to the virtual channel SNR $\Gamma$, determining a proper encoding mode ENC such that its error correction performance matches expected bit error rate BER, i.e. ENC=$f_2^{-1}$(BER,$\Gamma$), wherein $f_2$ represents a relational expression between the virtual channel SNR $\Gamma$ and the bit error rate BER in a coding mode ENC, and $f_2^{-1}$ represents the inverse operation of $f_2$;

(5) end A coding the channel eigenvector $\tilde{h}_a$ using the determined coding mode ENC and thereby obtaining a check sequence $P_a$; after receiving $P_a$, end B inputting $P_a$ together with the channel eigenvector $\tilde{h}_b$ in the end B into a decoder corresponding to ENC for decoding, and thereby obtaining an estimated value $\hat{\tilde{h}}_a$ of $\tilde{h}_a$; and (6) end A and end B applying a cryptographic key generating function on $\tilde{h}_a$ and $\hat{\tilde{h}}_a$ respectively to obtain a cryptographic key Kc, wherein $K_c = f_3(\hat{\tilde{h}}_a, N)$, wherein N is the length of the cryptographic key and $f_3$ is the cryptographic key generating function.

To achieve the above objects, the present invention further provides a method for determining a coding mode matching current channel features, the method comprising:

(1) according to a preset channel estimate method CE, both communication ends A and B performing channel estimate to a current channel, obtaining channel estimated values $\hat{h}_a$, $\hat{h}_b$ and channel estimate mean square error MSE, and defining MSE $f_1$(CE,$\gamma$) according to current channel Signal-to-Noise ratio $\gamma$, where $f_1$ represents a relational expression between the current channel Signal-to-Noise ratio γ and the channel estimate mean square error MSE when using the channel estimate method CE;

(2) according to a preset quantization mode and quantization step, performing quantization encoding to the obtained channel estimated values $\hat{h}_a$ and $\hat{h}_b$ respectively, thereby obtaining quantized channel eigenvectors $\tilde{h}_a$ and $\tilde{h}_b$;

(3) letting inconsistency between the channel eigenvector $\tilde{h}_b$ of end B and the channel eigenvector $\tilde{h}_a$ of end A, i.e. $\tilde{h}_b$+e be equivalent to obtaining $\tilde{h}_b$ at end B through virtual channel noise adding the channel eigenvector $\tilde{h}_a$ sent by end A, where SNR of the virtual channel is $$\Gamma = \frac{|\tilde{h}_a|^2}{E(|e|^2)} = \frac{1}{4[f_1(CE, \gamma) + MSE_Q]},$$

wherein e represents total quantization error of channel estimate results of ends A and B, and $MSE_Q$ represents quantization mean square error that is decided by the quantization step; and (4) according to the virtual channel SNR Γ, determining a proper encoding mode ENC such that its error correction performance matches expected bit error rate BER, i.e. $ENC=f_2^{-1}(BER,\Gamma)$, wherein $f_2$ represents a relational expression between the virtual channel SNR Γ and the bit error rate BER in a coding mode ENC, and $f_2^{-1}$ represents the inverse operation of $f_2$.

By leveraging the privacy, randomness and reciprocity of wireless channels where both communication parties are located, the present invention designs an adaptive method for consistent cryptographic key negotiating according to the SNR of a wireless environment where the both communication parties are located, which generates dynamic consistent cryptographic keys based on wireless channel status information and achieves information security and privacy at the physical layer.

DETAILED DESCRIPTION

Further illustration is presented below to the present invention in conjunction with the accompanying drawings and concrete embodiments.

Figure 1:
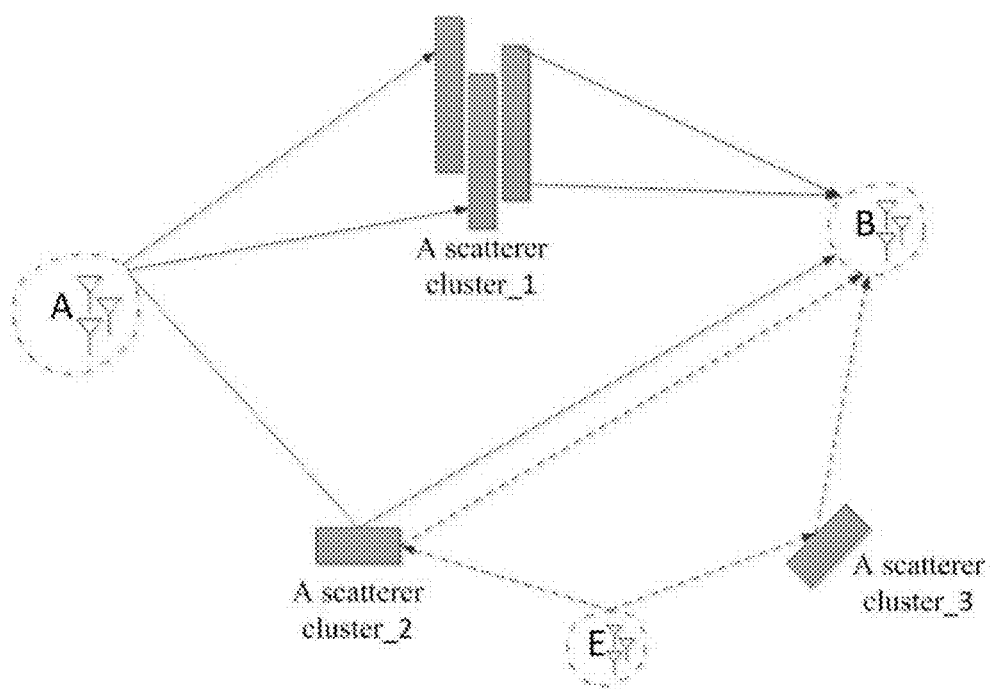
FIG. 1 is a schematic view of an application environment where the present invention is applied.

FIG. 1 shows a schematic view of an application environment to which the present invention is applicable, wherein A and B are legitimate users, E is an eavesdropper, and the propagation environment has rich scatterer clusters 1, 2 and 3.

Figure 2:
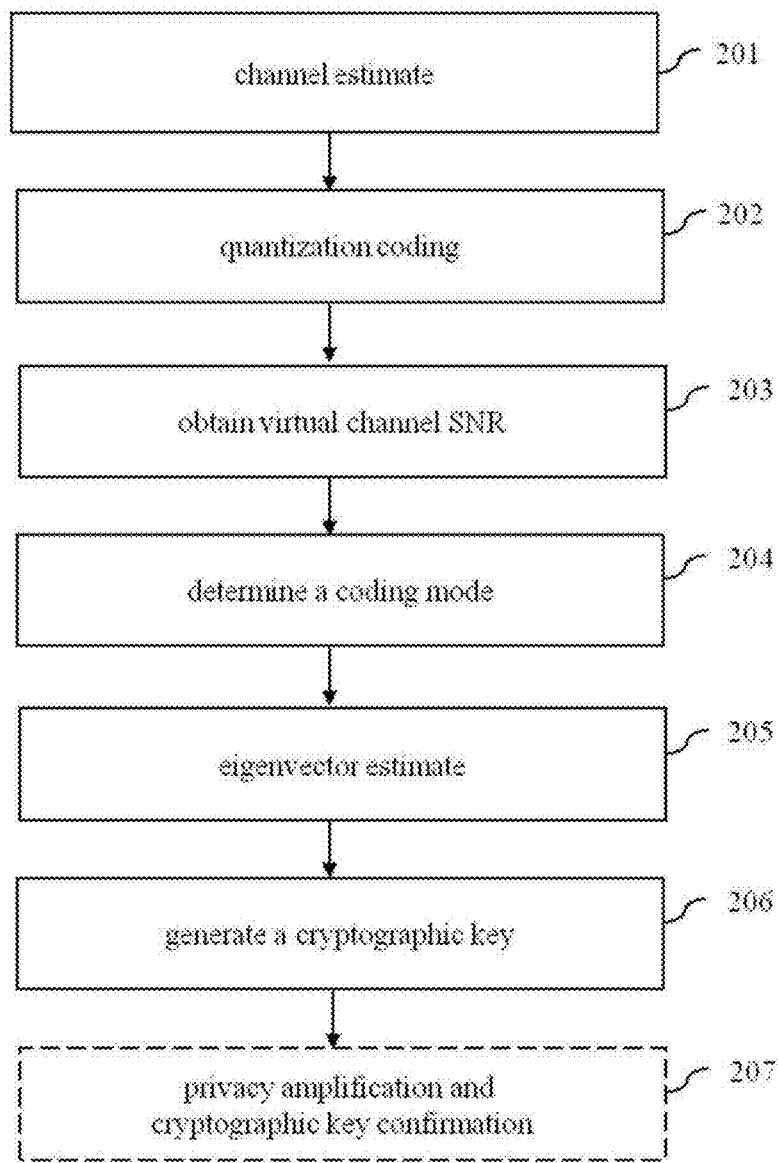
FIG. 2 is a flowchart of a method for generating a consistent cryptographic key based on wireless channel features according to an embodiment of the present invention.

FIG. 2 shows a flowchart of a method for generating a consistent cryptographic key based on wireless channel features according to an embodiment of the present invention, the method comprising:

Step 201: Channel Estimate

According to a preset channel estimate method CE, both communication parties A end and B end respectively perform channel estimate with respect to a current channel, obtain channel estimated values $\hat{h}_a$, $\hat{h}_b$ and channel estimate mean square error MSE, and define $MSE=f_1(CE,\gamma)$ according to the current channel Signal-to-Noise ratio γ, wherein $f_1$ represents a relational expression between the current channel SNR γ and the channel estimate mean square error MSE when using the channel estimate method CE.

Step 202: Quantization Encode

According to a preset quantization mode and quantization step, quantization encoding is performed to the obtained channel estimated values $\hat{h}_a$ and $\hat{h}_b$, whereby quantized channel eigenvectors $\tilde{h}_a$ and $\tilde{h}_b$ are obtained.

Step 203: Obtain a Virtual Channel SNR

There exists inconsistency between the channel eigenvector $\tilde{h}_b$ of end B and the channel eigenvector $\tilde{h}_a$ of end A due to channel estimate error and quantization error, i.e. $\tilde{h}_b=\tilde{h}_a$+e. This is equivalent to that the channel eigenvector $\tilde{h}_a$ sent by end A obtains $\tilde{h}_b$ at end B through virtual channel noise adding. The virtual channel SNR is $$\Gamma = \frac{|\tilde{h}_a|^2}{E(|e|^2)} = \frac{1}{4[f_1(CE, \gamma) + MSE_Q]},$$

wherein e represents total quantization error of channel estimate results of ends A and B, and $MSE_Q$ represents quantization mean square error that is decided by the quantization step.

Step 204: Determine Encoding Mode

According to the virtual channel SNR Γ, a proper encoding mode ENC is determined such that its error correction performance matches the desired bit error rate BER, i.e. $ENC=f_2^{-1}(BER,\Gamma)$, wherein $f_2$ represents a relational expression between the virtual channel SNR Γ and the bit error rate BER in the encoding mode ENC, and $f_2^{-1}$ represents the inverse operation of $f_2$.

Step 205: Eigenvector Estimate

End A encodes the channel eigenvector $\tilde{h}_a$ using the determined encoding mode ENC and thus obtains a check sequence $P_a$; after receiving $P_a$, end B inputs it together with the channel eigenvector $\tilde{h}_b$ in the end into a decoder corresponding to ENC for decoding, and then obtains an estimated value $\hat{\tilde{h}}_a$ of $\tilde{h}_a$.

Step 206: Generate a Cryptographic Key

End A and end B apply a cryptographic key generating function on $\tilde{h}_a$ and $\hat{\tilde{h}}_a$ respectively to obtain a cryptographic key Kc, wherein $K_c=f_3(\tilde{h}_a,N)$ wherein N is the length of the cryptographic key and $f_3$ is the cryptographic key generating function.

In addition, to verify the cryptographic key, there may be further comprised step 207 of privacy amplification and cryptographic key confirmation.

Figure 3:
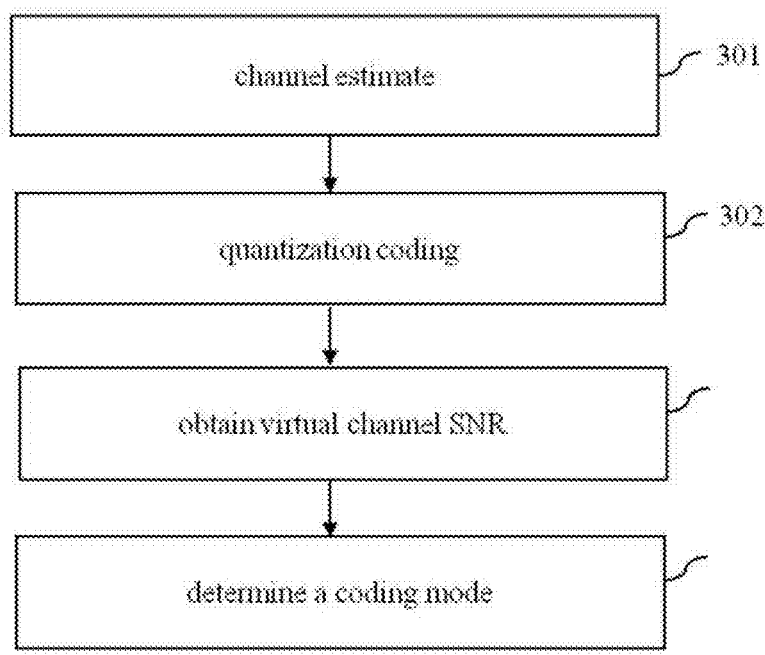
FIG. 3 is a flowchart of a method for determining a coding mode matching current channel features according to an embodiment of the present invention.

FIG. 3 shows a flowchart of a method for determining a coding mode matching current channel features according to an embodiment of the present invention, the method comprising:

Step 301: channel estimate

According to a preset channel estimating method CE, both communication ends A and B respectively performs channel estimate with respect to a current channel, obtain channel estimated values $\hat{h}_a$, $\hat{h}_b$ and channel estimate mean square error MSE, and define $MSE=f_1(CE,\gamma)$ according to the current channel Signal-to-Noise ratio γ, wherein $f_1$ represents a relational expression between the current channel SNR γ and the channel estimate mean square error MSE when using the channel estimate method CE.

Step 302: Quantization Encode

According to a preset quantization mode and quantization step, quantization encoding is performed to the obtained channel estimated values $\hat{h}_a$ and $\hat{h}_b$, whereby quantized channel eigenvectors $\tilde{h}_a$ and $\tilde{h}_b$ are obtained.

Step 303: Obtain a Virtual Channel SNR

There exists inconsistency between the channel eigenvector $\tilde{h}_b$ of end B and the channel eigenvector $\tilde{h}_a$ of end A due to channel estimate error and quantization error, i.e. $\tilde{h}_b = \tilde{h}_a + e$. This is equivalent to that the channel eigenvector $\tilde{h}_a$ sent by end A obtains $\tilde{h}_b$ at end B through virtual channel noise adding. The virtual channel SNR is $$\Gamma = \frac{|\tilde{h}_a|^2}{E(|e|^2)} = \frac{1}{4[f_1(CE, \gamma) + MSE_Q]}.$$

wherein e represents total quantization error of channel estimate results of ends A and B, and $MSE_Q$ represents quantization mean square error that is decided by the quantization step.

Step 304: Determine Encoding Mode

According to the virtual channel SNR Γ, a proper encoding mode ENC is determined such that its error correction performance matches the desired bit error rate BER, i.e. $ENC = f_2^{-1}(BER, \Gamma)$, wherein $f_2$ represents a relational expression between the virtual channel SNR and the bit error rate BER in the encoding mode ENC, and $f_2^{-1}$ represents the inverse operation of $f_2$.

Since the coding mode determining method shown in FIG. 3 is part of the method for generating a consistent cryptographic key shown in FIG. 2, or the method shown in FIG. 2 is an application scenario of the method shown in FIG. 3, detailed illustration is presented below to the idea of the present invention by taking the consistent cryptographic key generating scheme as the embodiment.

Generally speaking, the technical solution for generating a consistent cryptographic key of the present invention may be divided into four phases, namely channel estimate, quantization coding, adaptive cryptographic key negotiation and privacy amplification.

1. Channel Estimate

Although channel estimate may be implemented using the prior art, unlike the existing method for generating a cryptographic key based on wireless channel features, the present invention obtains not only channel estimated values $\hat{h}_a, \hat{h}_b$ but also channel estimate mean square error MSE through channel estimate, which is illustrated in detail below:

B sends a training sequence $s(t_1)$ to A at moment $t_1$, and A sends a training sequence $s(t_2)$ to B at moment $t_2$. Then, $$A: r_a(t_1) = s(t_1)h(t_1) + n(t_1) \quad (1)$$

$$B: r_b(t_2) = s(t_2)h(t_2) + n(t_2) \quad (2)$$

Where n is background white Gaussian noise, h is a channel fading value, and r is a received signal under the effect of channel noise adding and fading.

A and B perform channel estimate respectively, and then $$\hat{h}_a(t_1) = h(t_1) + z_a(t_1) \quad (3)$$

$$\hat{h}_b(t_2) = h(t_2) + z_b(t_2) \quad (4)$$

Where $\hat{h}_a$ and $\hat{h}_b$ are an estimated value of channel h by A and B respectively $z_a(t_1)$ and $z_b(t_2)$ represent channel estimate error. When the interval between $t_1$ and $t_2$ is less than the channel coherence time, as seen from channel reciprocity, $h(t_1) \approx h(t_2)$, so time parameters t1 and t2 can be ignored, and equations (3) and (4) can be rewritten as $$\hat{h}_a = h + z_a \quad (5)$$

$$\hat{h}_b = h + z_b \quad (6)$$

By different channel estimating algorithms, e.g. LS and LMMSE, the correlation between channel estimated values at A and B differs. Typically, the more precise channel estimate, the more correlated between $\hat{h}_a$ and $\hat{h}_b$; when using the same channel estimating algorithms, $z_a$ and $z_b$ are random variables distributed independently and identically, and moreover, the channel estimate MSE $$MSE = E\left\{\frac{|z|^2}{|h|^2}\right\}$$

decreases as the channel SNR $$\gamma = E\left\{\frac{\|s\|^2}{\|n\|^2}\right\}$$

increases, where $E\{\cdot\}$ represents expected operation.

An analytic expression between MSE and SNR γ can be obtained through theoretical analysis or numerical simulation. In the coherence time and when both communication parties use the same channel estimating method, $$MSE_a = E\left\{\frac{|z_a|^2}{|h_a|^2}\right\} = MSE_b = E\left\{\frac{|z_b|^2}{|h_b|^2}\right\} = MSE \quad (7)$$

Define a function $MSE = f_1(CE, \gamma)$, wherein CE represents a concrete channel estimating method.

For the channel estimate mean square error $MSE = f_1(CE, \gamma)$ of different channel estimating methods, its function relationships may be enumerated as below:

$$MSE = f_1(LS, \gamma) = \gamma^{-1} \quad (1) \text{ Least Squares Algorithm (LS)}$$

(2) Linear Minimum Mean Square Error (LMMSE)

$$MSE = f_1(LMMSE, \gamma) = \frac{1}{l}\sum_{i=1}^{l}\frac{\sigma_i^2}{\sigma_i^2 \gamma + 1}$$

Where l is the channel multipath number, $\sigma_i^2$ is the power of the $i^{th}$ multipath and $$\sum_{i=1}^{l}\sigma_i^2 = 1.$$

2. Quantization Coding

The quantization coding process of the present invention obtains the quantized channel eigenvectors $\tilde{h}_a$ and $\tilde{h}_b$ by using the same quantization coding scheme as the existing method for generating a cryptographic key based on wireless channel features. Detailed illustration is presented below.

Cryptographic keys must be random, i.e. cryptographic keys must be independently equiprobable. As a result, channel estimated values should be randomly fall within various quantization intervals during the quantization process of channel status information. To this end, a quantization method as below is adopted:

Suppose h follows the distribution with a probability density of p(h), where h may be the channel amplitude, phase, multipath latency or a combination thereof. The quantization series is M, and $M=2^n$, where n is the length of a cryptographic key being generated. The quantization Hierarchical level is $v_i$ where i=1, 2 ... M, and satisfies $$\int_{-\infty}^{v_i} p(x)dx = \frac{i}{M} \quad (8)$$

Thus, the randomness of cryptographic keys being generated is ensured. Coding uses equal-length code, which may be natural code or Gray code. Typically natural code is used in order to reduce the channel feature inconsistency caused by channel estimate error.

The quantized channel eigenvectors at both ends of B may be expressed as:

$$\tilde{h}_a = \hat{h}_a + q_a \quad (9)$$
$$= h + z_a + q_a$$
$$= h + e_a$$

$$\tilde{h}_b = \hat{h}_b + q_b \quad (10)$$
$$= h + z_b + q_b$$

Where $\tilde{h}_a$ and $\tilde{h}_b$ represent a quantized channel eigenvector at A and B respectively, $q_a$ and $q_b$ represent quantization error of a channel estimated value at A and B respectively, and $e_a$ and $e_b$ represent error between the channel quantization value and the channel true value at A and B respectively. As seen from equations (9) and (10), the relationship between channel quantization values at A and B is:

$$\tilde{h}_b = \tilde{h}_a + (q_b - q_a) + (z_b - z_a) \quad (11)$$
$$= \tilde{h}_a + e$$

Where e represents total quantization error of channel estimate values at A and B. As seen from equation (11), the channel quantization vector $\tilde{h}_b$ of end B may be regarded as the received signal at end B of the channel quantization vector $\tilde{h}_a$ sent by end A after virtual channel noise adding. The virtual channel equivalent SNR $\Gamma$ is:

$$\Gamma = E\left\{\frac{|\tilde{h}_a|^2}{|e|^2}\right\} \quad (12)$$

3. Adaptive Consistent Cryptographic Key Negotiation

The emphasis of this process is, by the virtual channel equivalent SNR $\Gamma$, to adaptively determine a proper coding mode such that its error correction performance matches the expected BER rather than using a single specific coding mode, whereby the consistency of cryptographic key generation is ensured. Detailed illustration is presented below.

Figure 4:
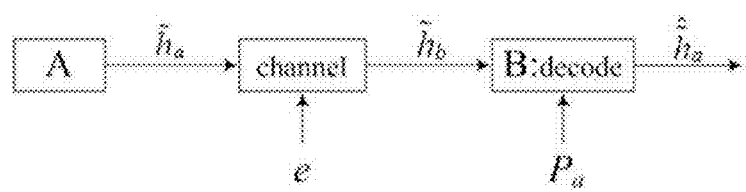
FIG. 4 is a schematic view of a distributed source coding model.
Figure 5:
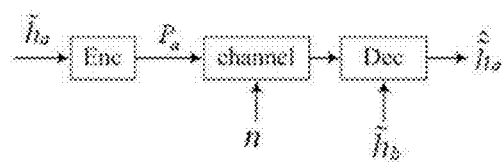
FIG. 5 is a schematic view of a distributed source coding system model implemented using channel coding.

The channel eigenvectors $\tilde{h}_a$ and $\tilde{h}_b$ obtained at ends A and B have great correlation, and meanwhile, have certain difference due to the presence of estimate error and quantization error. To generate consistent cryptographic keys, cryptographic key consistency negotiation is necessary. The problem of cryptographic key consistency negotiation is equivalent to the problem to be tacked by distributed source coding. A schematic view of the distributed source coding model is as shown in FIG. 4.

In the distributed source coding, the channel quantization vector $\tilde{h}_b$ at B may be regarded as the version of the channel quantization vector $\tilde{h}_a$ at A after virtual channel noise adding with a SNR of $\Gamma$, which virtual channel model is as shown by equation (11). B inputs $\tilde{h}_b$ and partial priori information Pa of $\tilde{h}_a$ into a decoder and thereby obtains the estimated value $\hat{\tilde{h}}_a$ of $\tilde{h}_a$, and it is expected that $\tilde{h}_a = \hat{\tilde{h}}_a$, i.e. it is expected to achieve the channel feature consistency.

Usually distributed source coding is implemented in channel coding mode. There are mainly two algorithms, one of which is based on syndromes and the other of which is based on check bits. Either the method using syndromes or the method using check bits needs to transfer the same amount of information. In practical applications, cryptographic key negotiation is implemented using LDPC (low-density paritycheck) codes, Turbo codes and other codes with excellent performance. The distributed source coding system model implemented using channel coding is as shown in FIG. 4.

Whether channel coding uses simple linear block codes or complex LDPC codes and Turbo codes, its error correction performance can be obtained through theoretical calculation or numerical simulation, whereby a relational expression between the SNR $\Gamma$ and BER can be obtained as below:

$$BER = f_2(ENC, \Gamma) \quad (13)$$

Where ENC represents a concrete coding mode, and $f_2$ represents a relational expression between the SNR $\Gamma$ and BER in the ENC coding mode. In turn, a required coding mode ENC can be determined by the SNR $\Gamma$ and expected BER, which is expressed as:

$$ENC = f_2^{-1}(BER, \Gamma) \quad (14)$$

Where $f_2^{-1}$ represents the inverse operation of $f_2$.

For a relational expression between the SNR $\Gamma$ and BER in a different coding mode, it is enumerated as below:

Under the fading channel:

$$BER \leq \int_0^\infty \min\left(0.5, \sum_{d=d_f}^\infty \frac{d}{N}a(d)Q(\sqrt{2d\Gamma})\right)p(\Gamma)d\Gamma$$

Under the AWGN channel:

$$BER \leq \sum_{d=d_f}^\infty \frac{d}{N}a(d)Q(\sqrt{2d\Gamma})$$

Where a(d) is the distance spectrum of a concrete coding scheme, $d_f$ is a free distance, N is the code word length, Q(•) is a Q function, and p($\Gamma$) is a probability density distribution function to which the channel SNR conforms.

From equations (7), (11) and (12), a calculation equation for the virtual channel equivalent SNR $\Gamma$ is:

$$\Gamma = \frac{|\tilde{h}_a|^2}{E(|e|^2)} \qquad (15)$$

$$= \frac{1}{E(|z_a - z_b|^2) + E(|q_a - q_b|^2)}$$

$$= \frac{1}{4[f_1(CE, \gamma) + MSE_Q]}$$

Where $MSE_Q$ represents quantization mean square error, which is determined by a quantization step.

The expected BER can be determined based on the virtual channel SNR $\Gamma$ and the channel eigenvector length L (of course, BER can be set according to received signal quality requirements, cryptographic key length or other factor, and the present invention is not intended to limit the determining mode of BER), and a proper coding mode ENC can be selected according to $\Gamma$ and BER from equation (14). Typically the error correction performance of this coding mode is higher than the expected BER by one to two orders of magnitude higher, so as to ensure cryptographic keys generated by both communication parties are consistent.

End B inputs the channel quantization vector $\tilde{h}_b$ therein together with the received check sequence Pa into a decoder corresponding to ENC, obtains an estimated value $\hat{\tilde{h}}_a$ of $\tilde{h}_a$ and further generates a cryptographic key Kc from this estimated value $\hat{\tilde{h}}_a$. The cryptographic key Kc can be generated in different manner according to the required length:

$$K_c = f_3(\hat{\tilde{h}}_a, N) \qquad (16)$$

Where N is the cryptographic key length, and $f_3$ is the cryptographic key generating function, e.g. using HASH function.

4. Privacy Amplification and Cryptographic Key Confirmation

This process may use the same scheme as the existing method for generating a cryptographic key based on channel features.

Privacy amplification refers to removing channel information which might be estimated by an eavesdropper or may be construed as removing bits in cryptographic keys which might be estimated by an eavesdropper. Generally privacy amplification is implemented using HASH function. Cryptographic key confirmation is to determine cryptographic keys which are generated by A and B legitimate users finally are completely consistent. A method is as below: generating a random number at end A, encrypting and transferring the random number to B, B decrypting the encrypted random number, applying XOR thereon, encrypting and returning the number to A, and finally A decrypting the number and checking whether the number is XOR of the transmitted random number.

Now illustration is presented to the implementation process of the present invention by using a detailed flow.

For a current system, known conditions may be: channel fading h(t) noise n(t), SINR $$\gamma = E\left\{\frac{\|s(t)\|^2}{\|n(t)\|^2}\right\},$$

and channel coherence time $\Delta t$.

First step: ends A and B send training sequences $s(t_1)$ and $s(t_2)$ respectively and $|t_1-t_2|<\Delta t$, so $h(t_1)=h(t_2)$ and the time parameter t is ignored in subsequent equations.

Second step: signals received by A and B are $r_a(t_1)=s(t_1)h(t_1)+n(t_1)$ and $r_b(t_2)=s(t_2)h(t_2)+n(t_2)$ respectively.

Third step: A and B perform channel estimate and thereby obtain channel estimated values $\hat{h}_a$, $\hat{h}_b$ and channel estimate mean square error $$MSE = E\left\{\frac{|z|^2}{|h|^2}\right\} = f_1(CE, \gamma),$$

where CE is a specific channel estimate algorithm.

Fourth step: A and B perform quantization coding and thereby obtain quantized channel eigenvector $\tilde{h}_a$, $\tilde{h}_b$.

Fifth step: calculate channel eigenvector errors at ends A and B. Since the estimated channel eigenvectors at ends A and B have inconsistency, i.e. $\tilde{h}_a = \tilde{h}_b + e$, where $|e|<\epsilon$, $\epsilon$ is channel eigenvector inconsistency metrics. The inconsistency may be equivalent to that the channel eigenvector estimated at end A is transferred via the virtual AWGN (additive white Gaussian noise) channel to end B, whereby $\tilde{h}_b$ is obtained, and the virtual channel SNR is:

$$\Gamma = \frac{|\tilde{h}_a|^2}{E(|e|^2)}.$$

Sixth step: determine a coding mode ENC. The coding mode ENC is determined by the expected bit error rate BER and SNR of the virtual AWGN channel, i.e. ENC=$f_2^{-1}$(BER, $\Gamma$)

Seventh step: A codes the channel eigenvector by using THE selected coding mode ENC, obtains a check bit sequence Pa and sends Pa to end B.

Eighth step: end B inputs the received check bit sequence Pa and its own channel eigenvector $\tilde{h}_b$ into a decoder corresponding to ENC for channel decoding, and thereby obtains $\hat{\tilde{h}}_a$, at which point the probability that $\hat{\tilde{h}}_a = \tilde{h}_a$ approximates 1.

Ninth step: ends A and B respectively apply a cryptographic key generating function to $\tilde{h}_a$, $\hat{\tilde{h}}_a$ and thereby obtain a cryptographic key $K_c = f_3(\hat{\tilde{h}}_a, N)$ Tenth step: privacy amplification and cryptographic key confirmation.

To sum up, the present invention provides a consistency negotiation method for adaptively generating a dynamic cryptographic key according to system Signal-to-Noise ratio, the method having the following characteristics:

1. When a channel estimate method used by both legitimate communication parties is determined, the channel estimate mean square error is obtained through calculation or numerical simulation according to SNR of a wireless environment where both parties are situated.

2. After channel quantization vectors of the both communication parties which are calculated according to the channel quantization vector length and quantization error determined by a quantization method act as input and output equivalent SNR of the "virtual channel" and thereby expected BER is determined, a proper channel coding mode can be determined according to the error correction performance of various channel coding methods, and cryptographic key consistency negotiation is achieved by the distributed source coding method.

INDUSTRIAL APPLICABILITY

By leveraging the privacy, randomness and reciprocity of wireless channels where both communication parties are located, the present invention proposes a method for consistent cryptographic key negotiating and generating which is adaptive to a wireless environment. Using the present invention, it is possible to increase the validity of consistent dynamic cryptographic key generating and achieve the information security and privacy at the physical layer. Moreover, by means of the technical solution of the present invention, it is possible to reduce transmission syndromes or check bits as much as possible and in turn, retain as many cryptographic key bits as possible after privacy amplification. In other words, the present solution can obtain more bits of cryptographic keys.

The invention claimed is:

1. A method for generating a consistent cryptographic key based on wireless channel features, characterized by comprising:
   (1) according to a preset channel estimate method CE, both communication ends A and B respectively performing channel estimate to a current channel, obtaining channel estimated values $\hat{h}_a$, $\hat{h}_b$ and channel estimate mean square error MSE, and defining MSE=$f_1$(CE,γ) according to current channel Signal-to-Noise ratio (SNR) γ, where $f_1$ represents a relational expression between the current channel Signal-to-Noise ratio γ and the channel estimate mean square error MSE when using the channel estimate method CE;
   (2) according to a preset quantization mode and quantization step, performing quantization encoding to the obtained channel estimated values $\hat{h}_a$, and $\hat{h}_b$ respectively, thereby obtaining quantized channel eigenvectors $\tilde{h}_a$ and $\tilde{h}_b$;
   (3) letting inconsistency between the channel eigenvector $\tilde{h}_b$ of end B and the channel eigenvector $\tilde{h}_a$ of end A, i.e. $\tilde{h}_b = \tilde{h}_a + e$ be equivalent to obtaining $\tilde{h}_b$ at end B through virtual channel noise adding the channel eigenvector $\tilde{h}_a$ sent by end A, where SNR of the virtual channel is $$\Gamma = \frac{|\tilde{h}_a|^2}{E(|e|^2)} = \frac{1}{4[f_1(CE, \gamma) + MSE_Q]},$$

wherein e represents total quantization error of channel estimate results of ends A and B, and $MSE_Q$ represents quantization mean square error that is decided by the quantization step;
   (4) according to the virtual channel SNR Γ, determining a proper encoding mode ENC such that its error correction performance matches expected bit error rate BER, i.e. ENC=$f_2^{-1}$(BER,Γ), wherein $f_2$ represents a relational expression between the virtual channel SNR Γ and the bit error rate BER in a coding mode ENC, and $f_2^{-1}$ represents the inverse operation of $f_2$;
   (5) end A coding the channel eigenvector $\tilde{h}_a$ using the determined coding mode ENC and thereby obtaining a check sequence Pa; after receiving Pa, end B inputting Pa together with the channel eigenvector $\tilde{h}_b$ in the end into a decoder corresponding to ENC for decoding, and thereby obtaining an estimated value $\hat{\tilde{h}}_a$ of $\tilde{h}_a$; and
   (6) end A and end B applying a cryptographic key generating function on $\tilde{h}_a$, and $\hat{\tilde{h}}_a$ respectively to obtain a cryptographic key Kc, wherein $K_c = f_3(\hat{\tilde{h}}_a, N)$ wherein N is the length of the cryptographic key and $f_3$ is the cryptographic key generating function.

2. The method according to claim 1, characterized by further comprising:
   (7) performing privacy amplification and cryptographic key confirmation to the obtained cryptographic key Kc.

3. The method according to claim 1, characterized in that the expression $f_1$ is obtained according to theoretical analysis or numerical simulation.

4. The method according to claim 1, characterized in that the expression $f_2$ is obtained according to theoretical analysis or numerical simulation.

5. The method according to claim 1, characterized in that the expected bit error rate BER is determined according to the virtual channel SNR Γ and channel eigenvector length L, wherein L is determined by cryptographic key length and quantization mode.

6. The method according to claim 1, characterized in that the error correction performance of the coding mode ENC is one to two orders of magnitude higher than the expected bit error rate BER.

7. A method for determining a coding mode matching current channel features, characterized by comprising:
   (1) according to a preset channel estimate method CE, both communication ends A and B respectively performing channel estimate to a current channel, obtaining channel estimated values $\hat{h}_a$, $\hat{h}_b$ and channel estimate mean square error MSE, and defining MSE=$f_1$(CE,γ) according to current channel Signal-to-Noise ratio (SNR) γ, where $f_1$ represents a relational expression between the current channel Signal-to-Noise ratio γ and the channel estimate mean square error MSE when using the channel estimate method CE;
   (2) according to a preset quantization mode and quantization step, performing quantization encoding to the obtained channel estimated values $\hat{h}_a$ and $\hat{h}_b$ respectively, thereby obtaining quantized channel eigenvectors $\tilde{h}_a$ and $\tilde{h}_b$;
   (3) letting inconsistency between the channel eigenvector $\tilde{h}_b$ of end B and the channel eigenvector $\tilde{h}_a$ of end A, i.e. $\tilde{h}_b = \tilde{h}_a + e$ be equivalent to obtaining $\tilde{h}_b$ at end B through virtual channel noise adding the channel eigenvector $\tilde{h}_a$ sent by end A, where SNR of the virtual channel is $$\Gamma = \frac{|\tilde{h}_a|^2}{E(|e|^2)} = \frac{1}{4[f_1(CE, \gamma) + MSE_Q]},$$

wherein e represents total quantization error of channel estimate results of ends A and B, and $MSE_Q$ represents quantization mean square error that is decided by the quantization step; and
   (4) according to the virtual channel SNR Γ, determining a proper encoding mode ENC such that its error correction performance matches expected bit error rate BER, i.e. ENC=$f_2^{-1}$(BER,Γ), wherein $f_2$ represents a relational expression between the virtual channel SNR Γ and the bit error rate BER in a coding mode ENC, and $f_2^{-1}$ represents the inverse operation of $f_2$.

8. The method according to claim 7, characterized in that the expression $f_1$ is obtained according to theoretical analysis or numerical simulation.

9. The method according to claim 7, characterized in that the expression $f_2$ is obtained according to theoretical analysis or numerical simulation.

10. The method according to claim 7, characterized in that the expected bit error rate BER is determined according to the virtual channel SNR $\Gamma$ and channel eigenvector length L, wherein L is determined by cryptographic key length and quantization mode.

11. The method according to claim 7, characterized in that the error correction performance of the coding mode ENC is one to two orders of magnitude higher than the expected bit error rate BER.

\* \* \* \* \*